Patented Jan. 8, 1946

2,392,756

UNITED STATES PATENT OFFICE 2,392,756

HALOPRENE COPOLYMER

Charles J. Mighton, Wilmington, Del., assignor to E. I. du Pont de Nemours & Company, Wilmington, Del., a corporation of Delaware No Drawing. Application May 20, 1942, Serial No. 443,761

12 Claims. (Cl. 260—78)

This invention relates to new rubber-like polymeric materials and, more particularly, to such materials made from halogen-substituted 1,3-butadienes (haloprenes) and esters of alpha-unsaturated alpha, beta-dicarboxylic acid with unsaturated alcohols.

It is well known that the rubber-like vulcanizates of polychloroprene are superior to those of natural rubber in such important respects as sunlight resistance, resistance to air or oxygen, and especially resistance to swelling in aromatic or aliphatic hydrocarbons or oils. On the other hand, polychloroprene vulcanizates tend to freeze or lose their characteristic elasticity more so than those of natural rubber when cooled to low temperatures. By polymerization of chloroprene (2-chloro-1,3-butadiene) with certain other polymerizable materials, it is possible to prepare synthetic rubbers which are not only much more freeze resistant than polychloroprene, but, in fact, equal to or superior to natural rubber in this respect. However, the improvements in freeze resistance resulting from polymerization with other polymerizable materials are often accompanied by considerable sacrifice in the product yields as well as in such properties as tensile strength and resistance to swelling in oils.

One object of the present invention, therefore, is to provide synthetic rubber-like materials of outstanding freeze resistance combined with oil or solvent resistance. A further object is the preparation of freeze-resistant and oil-resistant rubber-like materials in high yields. A further object is to provide a new and valuable class of synthetic rubber-like polymers. Other objects will appear hereinafter.

These objects are accomplished by the invention of new rubber-like polymeric materials made from haloprenes and esters of alpha-unsaturated alpha, beta-dicarboxylic acids with unsaturated monohydric alcohols of not more than ten carbon atoms.

Among the various halogen-substituted butadienes (haloprenes) which may be employed in the present invention, chloroprene is preferred in view of its availability at relatively low cost and the ease with which it polymerizes. Esters of alpha-unsaturated alpha, beta-dicarboxylic acids which are especially suitable for the present invention are the diallyl- or di-beta-methylallyl esters of maleic acid or, more preferably still, of fumaric acid. For most purposes, it is preferable to conduct the polymerization in an aqueous emulsion, particularly to avoid the formation of low molecular weight addition products of the diene and ester. In general, the aqueous emulsion, which may contain small amounts of certain modifying agents as described hereinafter, is maintained at 20–50° C. by warming or cooling as necessary until it shows no further significant increase in specific gravity. At this point, usually after 1½–2½ hours at 40° C., antioxidants such as secondary aromatic amines, for example, phenyl alpha-naphthylamine and diphenylamine, and/or stabilizers such as the tetraalkyl thiuram disulfides are preferably added to the emulsions. Coagulation of the polymers is effected readily by the addition of alcohol or aqueous solutions of sodium chloride, magnesium sulfate, aluminum sulfate or the like, and the rubber-like coagula are then washed and dried on rubber mills in the usual manner. The compounding and curing of the rubbers are carried out in the manner commonly employed with polychloroprene.

The following examples are given to illustrate more fully certain of the preferred embodiments of the invention. The scope of the invention is not limited to these particular examples for there are many suitable variations thereof as will become apparent hereinafter. Parts given are by weight.

Example I

This example will illustrate the preparation of a freeze-resistant polymerization product of chloroprene with diallyl fumarate.

A mixture consisting of 80 parts of chloroprene, 20 parts of diallyl fumarate, and 0.74 part of sulfur is emulsified at approximately 25° C. by rapid stirring with 6.1 parts of a 65 per cent solution of the sodium salt of sulfated oleyl acetate and 1 part of the sodium salt of a sulfonated naphthalene-formaldehyde condensation product (prepared according to U. S. Patent No. 1,336,759) in 223 parts of water. The temperature of the emulsion rises rapidly and is maintained at 40° C. for a period of 2 hours and 50 minutes or until the specific gravity of the emulsion shows no significant increase during a period of 15 to 20 minutes. Two (2) parts of a 50 per cent aqueous dispersion of a 55:45 eutectic mixture of phenyl alpha-naphthylamine and diphenylamine, and 8 parts of a 25 per cent aqueous dispersion of tetraethyl thiuram disulfide are mixed with the resulting rubber-like latex. The polymer is then coagulated by the addition of aqueous sodium chloride solution. The soft, coherent coagulum is washed with warm and cold water on a small corrugated rubber mill until essentially free from soap, and then dried on a moderately warm mill fitted with smooth rolls. During the latter operation, 1 per cent of phenyl betanaphthylamine and 1 per cent of tetramethyl thiuram disulfide (based on the weight of the practically dry interpolymer) are added. Ninety-six (96) parts of a soft plastic rubber-like polymer are obtained. Ten (10) parts of the polymer are compounded with 0.4 part of magnesium oxide, 0.5 part of zinc oxide, and 3.6 parts of carbon black according to the procedure employed with polychloroprene. Upon curing the compounded stock for 30 minutes at 145° C., a pliable, elastic vulcanizate is obtained which exhibits a tensile strength of 2610 pounds per square inch at 400 per cent elongation. Immersion of the vulcanizate in kerosene for 48 hours at 100° C. causes it to increase only 44.4 per cent in volume whereas a corresponding vulcanizate of polychloroprene shows approximately 65 per cent increase in volume under the same conditions. Not only do vulcanizates of this interpolymer exhibit excellent kerosene or oil resistance, but they possess outstanding freeze resistance as well. The test by which freeze resistance is evaluated is carried out as follows. A sample of uniform cross section of the vulcanized material is stretched 170 per cent. It is cooled slowly in a bath to $-70°$ C. in this stretched condition. The tension on the sample is then removed, the temperature is raised slowly, and the sample is allowed to contract freely. The temperatures at which the sample shows 10 per cent, 50 per cent, 90 per cent, etc., of the total retraction possible are recorded. The lower the temperature for a given per cent retraction, the greater the freeze resistance as the term is used in this application. In the following table, the temperatures for 10 per cent, 50 per cent, and 80 per cent retraction of the above 20 per cent diallyl fumarate/80 per cent chloroprene interpolymer are recorded, and included also for comparison only are the corresponding values observed for polychloroprene.

*Table I*

| Initial monomer composition | Polymer yield | Per cent volume increase in kerosene after 48 hrs./ 100° C. | Temperature for retraction | | |
|---|---|---|---|---|---|
| | | | 10% | 50% | 80% |
| | | | °C. | °C. | °C. |
| 1. 80% chloroprene; 20% diallyl fumarate | 96 | 44 | −39.3 | −25.4 | −6.4 |
| 2. 100% chloroprene | 90–93 | 65 | −25 | +4 | +13 |
| 3. Rubber (freeze resistant stock) | Dissolves or disintegrates | | −45 | −25 | −10 |

*Example II*

This example will illustrate the preparation of a freeze-resistant polymerization product of 80 per cent chloroprene with 20 per cent di-(beta-methyl allyl) fumarate.

A mixture of 60 parts of chloroprene, 15 parts of di-(beta-methyl allyl) fumarate and 0.56 part of sulfur is emulsified with an aqueous phase consisting of 4.6 parts of a 65 per cent solution of the sodium salt of sulfated oleyl acetate, 0.75 part of the sodium salt of a sulfonated naphthalene-formaldehyde condensation product, and 167 parts of water. The temperature of the emulsion is maintained at 40° C. for about 2½ hours, or until the specific gravity of the emulsion reaches 1.045. The resulting rubber-like latex is then stabilized, coagulated, washed, and finally dried as in Example I. Sixty-nine and two-tenths (69.2) parts of a soft, plastic, rubber-like polymer are obtained. After compounding, as described in Example I, and after curing for 30 minutes at 145° C., a pliable, elastic, rubber-like vulcanizate is obtained. The vulcanizate stretches 300 per cent under a stress of 1420 pounds per square inch, and the tensile strength is 2500 pounds per square inch at a maximum elongation of 435 per cent. Upon immersion in kerosene for 48 hours at 100° C., it shows only 47.5 per cent increase in volume. Its freeze resistance is markedly superior to that of polychloroprene as illustrated by the following retraction temperatures: $T_{10\%}=-38.9°$ C.; $T_{50\%}=-22°$ C.; $T_{80\%}=-3.7°$ C.

*Example III*

This example will illustrate the preparation of a polymer of chloroprene with di-(beta-methyl allyl) maleate.

A mixture of 60 parts of chloroprene, 15 parts of di-(beta-methyl allyl) maleate and 0.56 part of sulfur is polymerized in emulsion as described in Example II. After treating the resulting rubber-like latex with antioxidants and stabilizers, the polymer is coagulated with aqueous sodium chloride and alcohol, washed with water on a small corrugated mill, and dried on a small smooth mill. Sixty-seven (67) parts of a soft, plastic, rubber-like material are obtained. Analysis of the product for chlorine shows that it contains 5.4 per cent of di-(beta-methyl allyl) maleate. Upon curing a stock compounded by the formula given in Example I, a soft, elastic vulcanizate is obtained which exhibits only 49.8 per cent volume increase after immersion in kerosene for 2 days at 100° C. This polymer is more freeze resistant than polychloroprene.

Although the examples relate particularly to products made from chloroprene and maleic or fumaric esters of allyl or beta-methyl allyl alcohols, the invention includes broadly the polymeric products made from any halogen-substituted 1,3-butadiene (haloprene) with esters of any monohydric unsaturated alcohol of not more than ten carbons and any alpha-unsaturated alpha,beta-dicarboxylic acid. Included among the various halogenated dienes which may be employed are 2-chloro-1,3-butadiene, 2-bromo-1,3-butadiene, 2-iodo-1,3-butadiene, 1-chloro-1,3-butadiene, 2-chloro-3-methyl-1,3-butadiene, 1-methyl-2-chloro-1,3-butadiene, 2,3-dichloro-1,3-butadiene, 1,2,4-trichloro-1,3-butadiene, and the like. Among the halogenated dienes, those in which the halogen atom is in the beta position; i. e., on one of the two carbon atoms between the conjugated double bonds, are preferred since they give polymers having superior rubber-like properties. Of these, 2-chloro-1,3-butadiene is especially preferred. Mixtures of two or more such haloprenes may be employed.

In reference to the esters included within the scope of this invention, the term alpha-unsaturated alpha,beta-dicarboxylic acid is meant to include any acid having but two carboxyl groups and those on two adjacent carbon atoms, of which at least one is directly attached to an ethylenic double bond. As suitable alcohols from which the esters are obtained, there may be mentioned allyl alcohol, alpha-methyl allyl alcohol, beta-methyl allyl-, crotyl-, and tiglyl-alcohols, geraniol, butadiene-1,2-ol-4, allyl carbinol, 2,4-hexadiene-1-ol, ethinyl dimethyl carbinol, propargyl alcohol, styryl carbinol, and the like. Unsaturated dibasic acids which are satisfactory include maleic acid or its various mono- or di-substitution products including methyl maleic acid (citraconic), ethyl maleic, or phenyl maleic acids, halogen-substituted maleic acids as, for example, chloro-, bromo-, or iodo-maleic acids, itaconic acid and substitution products thereof such as methyl or ethyl itaconic acids. Particularly valuable are unsaturated alcohol esters of fumaric acid or its various substitution products including chloro-, bromo-, or iodofumaric acids, methyl fumaric acid (mesaconic), ethyl, propyl, or phenyl fumaric acids, and the like. In general, esters of any monohydric, unsaturated alcohol of not more than ten carbons with any alpha-unsaturated, alpha, beta-dicarboxylic acid are suitable for the preparation of valuable rubber-like polymerization products with haloprenes. As specific examples of esters satisfactory for the process of this invention may be mentioned diallyl maleate, di-(alpha-methyl allyl) maleate, di-(beta-methyl allyl) maleate, ditiglyl maleate, di-(alpha-methyl allyl) citraconate, di-(1,2-butadiene-4-yl) ethyl maleate, diallyl chloromaleate, di-propargyl bromomaleate, di-(2,4-hexadiene-6-yl) maleate, di-(1-butene-4-yl) phenyl maleate, dicinnamyl bromomaleate, dicrotyl itaconate, digeranyl ethylmaleate, diallyl glutaconate, diallyl fumarate, di-(alpha-methyl allyl) fumarate, di-(beta-methyl allyl) fumarate, dipropargyl fumarate, di-(1,2-butadiene-4-yl) fumarate, dicrotyl chlorofumarate, dicinnamyl mesaconate, ditiglyl propyl fumarate, di-(alpha-methyl allyl) phenyl fumarate, etc. Of the various esters which are applicable, the fumaric esters of allyl alcohol, alpha-methyl allyl- or beta-methyl allyl alcohol are particularly preferred in view of their relatively low cost and the ease with which they polymerize with haloprenes in high yields.

The proportions of the polymerizable components initially present may be varied over a wide range, but, in order to obtain products of predominantly rubber-like properties, it is usually desirable that at least 50 per cent, by weight, of the total polymerizables be haloprene. The preferred initial ester concentration is 15 to 40 per cent, by weight, and still more preferred is 20 to 30 per cent, although valuable products are obtained from haloprene/ester compositions in which the ester concentration is above or below these preferred limits. For example, as the initial ester concentration is reduced below 15 per cent, the properties of the resulting rubbers become progressively more like those of the polyhaloprene. Useful products which may be vulcanized are obtained when the ester concentration is above 50 per cent, but, in general, these exhibit lower tensile properties and no significant improvement in freeze resistance over interpolymers of 20 to 30 per cent ester content.

It is sometimes desirable to have present, during polymerization of the haloprene and ester, other polymerizable or non-polymerizable materials including vinyl- or vinylidene-type compounds such as styrene, vinyl acetate, or vinyl propionate, esters of acrylic or methacrylic acids such as the methyl, ethyl, propyl, butyl, cyanomethyl esters, etc., acrylonitrile, methacrylonitrile, asymmetrical dichloroethylene, vinyl chloride, and the like; also film-forming materials including paint or varnish adjuncts such as natural or synthetic resins, drying oils, cellulose derivatives and the like. The haloprene should amount to at least half of the total weight of polymerizable and film-forming materials if a product of predominantly rubber-like properties is desired. Furthermore, if the desirable properties arising from the use of the esters of unsaturated alcohols and unsaturated acids are to be retained to an important extent, the latter should be present in greater amount than the vinyl or vinylidene compound or film-forming material.

The polymerization of ester and haloprene may be carried out by any of the conventional methods well known in the art, such as in bulk without solvents or diluents, in the presence of an inert solvent, or in emulsion. As illustrated in the examples, it is preferred that the aqueous emulsion technique be used to avoid the formation of undesirable low molecular weight products. Also, it gives higher yields and a more rapid and readily controlled polymerization. In aqueous emulsion, the polymerization may be carried out under alkaline, neutral, or acidic conditions. In most instances, however, it has been observed that products obtained by the use of neutral and especially slightly acidic emulsion systems are superior in such respects as mill behavior and rubber-like properties of the vulcanizates to those obtained under alkaline conditions. Furthermore, the polymerization in essentially neutral or slightly acidic emulsions generally proceeds more rapidly with higher yields and more complete utilization of the alpha-unsaturated alpha, beta-dicarboxylic acid esters. The acidity of the emulsion system is not critical, however. It is usually found, for example, that the concentration of acid normally present in emulsifying agents such as the sodium salt of sulfated oleyl acetate is sufficient to give excellent results without the use of additional acid. Nor is the emulsifying agent or its concentration in the aqueous phase critical, although agents which function under acidic conditions are obviously preferred. Examples of such agents are sodium octyl sulfate, sodium cetyl sulfate, sodium oleyl sulfate, the sodium salt of sulfated oleyl acetate as illustrated in the examples, sodium isopropyl naphthalene sulfate, as well as the corresponding potassium or ammonium salts; also N-stearyl betaine, N-hydroxypropyl-C-cetyl betaine, C-cetyl betaine, organic or inorganic salts of long-chain aliphatic amines such as octyl, lauryl, oleyl, stearyl amines and cetyl para-dimethyl aminobenzoate, and the like. Under alkaline conditions, the sodium or potassium salts of oleic, palmitic, stearic, linoleic, linolenic, abietic (rosin) acids, etc., are found to be satisfactory. Usually 1 to 4 per cent solutions of the emulsifying agents are employed, but, depending on the properties of the emulsifying agent as well as the particular polymerizable monomers and their ratio, stronger or weaker solutions, for example, 0.02 per cent to 10 per cent may be used. In general, therefore, any emulsifying or dispersing agent or any combination of two or more such agents which, when dissolved in water, is capable of producing a stable emulsion of the polymerizable materials, may be employed. The ratio of aqueous to non-aqueous phase in the emulsion may likewise be varied greatly. For practical purposes, the preferred concentration of the non-aqueous phase is between 30 and 50 per cent. Lower concentrations result in equally satisfactory products, but the process is less economical in view of the large reaction vessels required and the somewhat slower rate of polymerization. At higher concentrations, especially in the preferred acidic emulsion systems, the polymerization is apt to proceed too rapidly to be controlled readily, although, under such conditions, satisfactory products likewise can be obtained. The emulsions may be agitated during polymerization by stirring or shaking, in order to promote heat interchange with the temperature-controlling medium.

The polymerization may be accelerated, if desired, by means of any of the usual polymerization catalysts well known for this purpose. Such agents include organic or inorganic persulfates, perborates, or peroxides, for example, ammonium, potassium, or sodium persulfates, sodium or potassium perborates, hydrogen peroxide, acetyl peroxide, benzoyl peroxide, and the like. In slightly acidic emulsion systems, however, the addition of such catalysts is usually unnecessary as illustrated in the examples; under alkaline conditions, e. g., in a sodium rosinate emulsion, the use of 0.25 per cent to 2 per cent of a polymerization catalyst is more often desirable.

The preferred temperature of polymerization is between about 20° C. and 50° C. Higher temperatures are less desirable because of difficulties encountered in controlling the polymerization and also losses of volatile material, particularly of the haloprenes, unless closed reaction vessels are employed. On the other hand, at lower temperatures, i. e., below 20° C., the polymerization is slower, and, in addition, the vulcanizates have somewhat poorer freeze resistance than those prepared at higher temperatures, although the working properties are usually improved. For practical purposes, it is preferred to operate at normal pressures, but sub-atmospheric or super-atmospheric pressures may be employed as desired depending on the chosen temperature of polymerization and the particular monomer components. The properties of the polymerizates, especially their plasticity and mill behavior, may be varied by including, with the polymerizable materials in emulsion, small proportions of agents which are known to modify the properties of polychloroprene. Thus, agents which give plastic products directly in the case of chloroprene include mercaptans, for example, octyl-, lauryl-, or xylyl mercaptan, hydrogen sulfide and thioglycolic acid, toluene sulfinic acids, and sulfur dioxide. The polymeric products made from the haloprenes in the presence of sulfur may be plasticized, if desired, by milling, for example, in the presence of cold water and with a small amount of a thiuram disulfide, preferably a tetra-substituted thiuram disulfide such as tetra-methyl-, tetraethyl-, tetrabutyl-, or dipentamethylene thiuram disulfide and other agents described in U. S. Patent No. 2,234,215 including the thionaphthols and the substituted ammonium salts of di-substituted dithiocarbamic acids. These agents are usually added to the polymerizates before coagulation.

Prior to coagulation of the copolymers, it is desirable to incorporate small amounts, e. g., 1 per cent to 2 per cent, of antioxidants, particularly secondary aromatic amines such as phenyl alpha- or phenyl beta-naphthylamine, and diphenylamine. At this stage also, agents such as the tetraalkyl thiuram disulfides which tend to stabilize the isolated polymers against changes in plasticity upon storage are preferably added. Further quantities of these agents may be added to the polymers during drying, if desired.

Coagulation of the interpolymers from emulsion may be effected by any of the well known methods such as by the addition of an aqueous solution of sodium chloride, magnesium sulfate, aluminum sulfate, and the like, by the addition of acids, bases, or alcohols, or by freezing. The compounding and curing of the products of the present invention are effected readily and satisfactorily by methods generally employed in the compounding and curing of polychloroprene or of natural rubber. Vulcanizates of excellent elasticity and good tensile strength are readily obtained from stocks compounded with zinc oxide, especially in combination with magnesium oxide or lead oxide. Incorporation of reinforcing or semi-reinforcing carbon blacks is usually desirable in order to obtain optimum tensile properties. Sulfur, rubber vulcanization accelerators, and various rubber or synthetic rubber plasticizers may be incorporated, if desired.

The products made according to the present invention are suitable for use in a variety of applications in which natural rubber or synthetic rubber-like materials are employed. The latex-like emulsions of the interpolymers can be employed as is natural rubber latex for the preparation of dipped, coated, or impregnated articles. Solutions of the interpolymers in organic solvents can likewise be used for the preparation of films, and various dipped, coated, calendered, or impregnated goods. In view of their excellent resistance to swelling in oils, vulcanizates of these products can be employed in many well known applications wherein polychloroprene is used and where natural rubber is wholly unsatisfactory. Moreover, vulcanizates of the polymers described herein are, in general, much more freeze resistant than those of polychloroprene, and their usefulness, therefore, is greatly enhanced.

It is apparent that many widely different embodiments of this invention may be made without departing from the spirit and scope thereof, and, therefore, it is not intended to be limited except as indicated in the appended claims.

I claim:

1. Polymeric material obtained by polymerizing a halogen-substituted 1,3-butadiene containing not more than 3 halogen atoms in the presence of a di-ester of an aliphatic alpha-unsaturated alpha, beta-dicarboxylic acid and a monohydric unsaturated alcohol, which alcohol contains up to 10 carbon atoms.

2. Polymeric material obtained by polymerizing 2-chloro-1,3-butadiene in the presence of an aliphatic ester of a di-alpha-unsaturated alpha, beta-dicarboxylic acid and a monohydric unsaturated alcohol, which alcohol contains up to 10 carbon atoms.

3. Polymeric material obtained by polymerizing in emulsion a mixture of 2-chloro-1,3-butadiene and a di-ester of an aliphatic alpha-unsaturated alpha, beta-dicarboxylic acid and a monohydric unsaturated alcohol, which alcohol contains up to 10 carbon atoms, wherein the 2-chloro-1,3-butadiene is the predominant polymerizable material.

4. Polymeric material obtained by polymerizing in emulsion a mixture of 2-chloro-1,3-butadiene and a di-ester of an aliphatic alpha-unsaturated alpha, beta-dicarboxylic acid and a monohydric unsaturated alcohol, which alcohol contains up to 10 carbon atoms, wherein the 2-chloro-1,3-butadiene constitutes from about 80 to about 70 per cent of the total polymerizable materials present.

5. Polymeric material obtained by polymerizing 2-chloro-1,3-butadiene in the presence of a maleic acid di-ester of an aliphatic monohydric unsaturated alcohol, which alcohol contains up to 10 carbon atoms.

6. Polymeric material obtained by polymerizing 2-chloro-1,3-butadiene in the presence of di-(beta-methyl allyl) maleate.

7. Polymeric material obtained by polymerizing in emulsion a mixture of 2-chloro-1,3-butadiene and di-(beta-methyl allyl) maleate, wherein the 2-chloro-1,3-butadiene constitutes from about 80 to 70 per cent of the total polymerizable material present.

8. Polymeric material obtained by polymerizing 2-chloro-1,3-butadiene in the presence of a fumaric acid di-ester of an aliphatic monohydric unsaturated alcohol, which alcohol contains up to 10 carbon atoms.

9. Polymeric material obtained by polymerizing 2-chloro-1,3-butadiene in the presence of di-(beta-methyl allyl) fumarate.

10. Polymeric material obtained by polymerizing in emulsion a mixture of 2-chloro-1,3-butadiene and di-(beta-methyl allyl) fumarate, wherein the 2-chloro-1,3-butadiene constitutes from about 80 to about 70 per cent of the total polymerizable material present.

11. Polymeric material obtained by polymerizing 2-chloro-1,3-butadiene in the presence of diallyl fumarate.

12. Polymeric material obtained by polymerizing in emulsion a mixture of 2-chloro-1,3-butadiene and diallyl fumarate, wherein the 2-chloro-1,3-butadiene constitutes from about 80 to 70 per cent of the total polymerizable material present.

CHARLES J. MIGHTON.